United States Patent [19]

Nicholson

[11] 3,761,102
[45] Sept. 25, 1973

[54] SEALING MEANS
[75] Inventor: Terence Peter Nicholson, Stocksfield, England
[73] Assignee: The Corrugated Packing and Sheet Metal Company Limited
[22] Filed: July 19, 1971
[21] Appl. No.: 163,929

[30] Foreign Application Priority Data
July 17, 1970 Great Britain.................. 34,862/70

[52] U.S. Cl. ............................ 277/206 R, 277/236
[51] Int. Cl. ............................................ F16j 15/08
[58] Field of Search.................. 277/180, 205, 206, 277/236, 152; 285/DIG. 18

[56] References Cited
UNITED STATES PATENTS
2,701,155 2/1955 Estel, Jr. ............................ 277/152
3,595,588 7/1971 Rode ............................. 277/206 R
3,058,750 10/1962 Taylor ......................... 285/DIG. 18

Primary Examiner—Samuel B. Rothberg
Attorney—Jones & Lockwood

[57] ABSTRACT

A sealing ring which is C-shaped in cross-section has an annular spring member located between the arms of the C and tending to force them outwardly. The spring member may be W-shaped in cross-section with the outer arms of the W lying against the ring.

2 Claims, 1 Drawing Figure

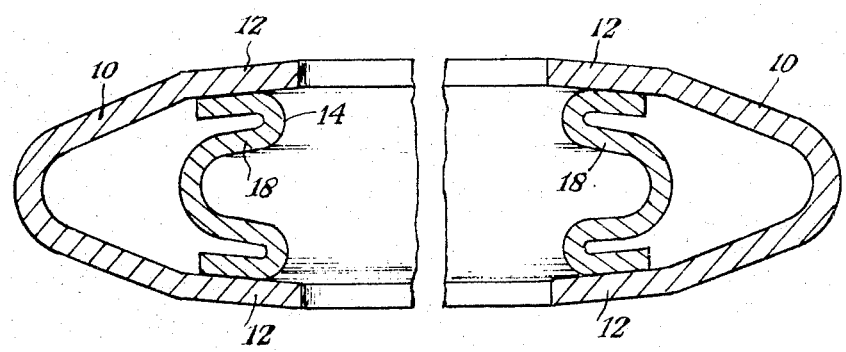

SEALING MEANS

This invention relates to gaskets or washers in the form of sealing rings.

A simple form of sealing ring is one which is C-shaped in cross-section. Such a shape, however, provides difficulties in design. The free edges of the ring, at each end of the C in cross-section must not make too great an angle with the sealing surfaces against which they are to be clamped, and must be capable of flexing readily on clamping pressure being applied to the sealing surfaces. On the other hand, the outward spring pressure of the ring must be maintained in order that the seal between the ring and the sealing surfaces shall not be broken.

According to the present invention I provide a sealing ring which is C-shaped in cross-section, and which has an annular spring member located between the arms of the C, and tending to force them outwardly.

One form of the invention is shown in cross-section in the accompanying drawing.

As shown in the drawing, the sealing ring comprises a C-shaped ring 10 with free edge portions 12, and an annular spring member 14 located between the arms of the C and tending to force them outwardly. In cross-section the spring member 14 takes the form of the letter W as shown, the outer arms of the W lying against the ring 10.

When the sealing ring is clamped between two plane sealing surfaces, the edge portions 12 are the first to make contact with the sealing surfaces; and, as the clamping or bolt pressure between the sealing surfaces is augmented, the portions 12 flex inwardly in contact with these surfaces. The pressure between the edges of the portions 12 and the sealing surfaces is however maintained by reason of the pressure exerted by the spring member 14.

What I claim and desired to protect by Letters Patent is:

1. A sealing ring combination having two ring elements, a first of the said two ring elements being a unitary resilient C-ring and a second of the said two ring elements being a unitary resilient W-ring
   1. the C-ring having the following characteristics (a) and (b):
      a. a central axis about which it is generated
      b. material of uniform thickness as seen in radial cross section and formed to provide a channel having
         i. a rounded radially outermost peripheral portion furthest from the central axis and forming a rounded base of a channel
         ii. a pair of radially inwardly directed annular side walls having each a portion lying generally transverse to the central axis and offering free lips nearest to the central axis and axially mutually spaced apart whereby to define a channel opening to the central axis and having the said rounded base and with side walls resiliently movable in axial directions against deformation of the channel
   2. the W-ring having the following characteristics (c) and (d);
      c. a central axis about which it is generated,
      d. material of uniform thickness as seen in radial cross section and formed to provide
         i. two axially spaced-apart axially outer annular flanges having free edges at their respective radially outermost peripheries
         ii. a resilient channel axially between the said flanges and having a rounded base and two side walls,
         iii. arcuate-section link portions joining the said flanges respectively to the said side walls of the channel at the radially inward peripheries of the flanges,
         iv. the said flanges lying generally transverse to the central axis and adapted to lie face to face with the said portions of the side walls of the C-ring,
         v. the said channel being disposed with its base at a greater radial distance from the central axis than the said link portions
   3. the combination having characteristics (e) and (f);
      e. that the central axes of the C-ring and the W-ring are coincident
      f. that the said flanges are juxtaposed face to face against respective said portions of the side walls of the channel of the C-ring
   whereby the W-ring acts as a compression spring within the channel of the C-ring and resiliently reinforces the resilience of the walls of the said channel against axially mutually inwardly directed forces.

2. A sealing ring combination as claimed in claim 1 wherein th C-ring has the following additional characteristics (g) and (h):
   g. a pair of first frusto conical side wall portions diverging axially at an angle from each other and merging at their axially mutually closest ends with the rounded outermost peripheral portion of the ring
   h. a pair of second frusto conical side wall portions, forming the said portions of the side walls lying transverse to the central axis, diverging axially at an angle from each other and merging at their axially mutually closest ends with the respective first frusto conical portions, the said lips being at the radially innermost edges of the said second frusto conical portions, the angle of divergence of the second pair of frusto conical portions being less than that of the first pair,
   and the W-ring has the additional characteristic (j):
   j. that the said flanges are frusto conical and are axially divergent at an angle equal to the angle of divergence of the said second frusto conical side wall portions of the C-ring.

* * * * *